(12) United States Patent
Guest

(10) Patent No.: US 6,490,093 B2
(45) Date of Patent: Dec. 3, 2002

(54) METHOD OF PROTECTING INK AND PROVIDING ENHANCED BONDING DURING MOLDING OF LENTICULAR LENS SHEETS IN PLASTIC OBJECTS

(75) Inventor: Richard Guest, Littleton, CO (US)

(73) Assignee: Digital Replay, Inc., Englewood, CO (US)

( * ) Notice: Subject to any disclaimer, the term of this patent is extended or adjusted under 35 U.S.C. 154(b) by 37 days.

(21) Appl. No.: 09/790,917

(22) Filed: Feb. 22, 2001

(65) Prior Publication Data

US 2002/0114080 A1 Aug. 22, 2002

Related U.S. Application Data

(60) Provisional application No. 60/257,588, filed on Dec. 22, 2000.

(51) Int. Cl.[7] .............................................. G02B 27/10
(52) U.S. Cl. ........................ 359/619; 359/620; 359/628
(58) Field of Search ................... 359/619, 620, 359/625, 628

(56) References Cited

U.S. PATENT DOCUMENTS

| | | | | |
|---|---|---|---|---|
| 2,499,453 | A | * 3/1950 | Bonnet ..................... | 359/625 |
| 3,119,195 | A | 1/1964 | Braunhut .................... | 46/1 |
| 5,003,915 | A | 4/1991 | D'Amato et al. ............. | 118/46 |
| 5,098,302 | A | 3/1992 | Sekiguchi .................... | 434/426 |
| 5,181,471 | A | 1/1993 | Sillars ........................ | 101/483 |
| 5,330,799 | A | 7/1994 | Sandor et al. ............... | 427/510 |
| 5,457,515 | A | 10/1995 | Quadracci et al. .......... | 355/132 |
| 5,494,445 | A | 2/1996 | Sekiguchi et al. ........... | 434/365 |
| 5,554,432 | A | 9/1996 | Sandor et al. ............... | 428/157 |
| 5,560,799 | A | 10/1996 | Jacobsen .................... | 156/277 |
| 5,642,226 | A | 6/1997 | Rosenthal ................... | 359/619 |
| 5,695,346 | A | 12/1997 | Sekiguchi et al. .......... | 434/365 |
| 5,696,596 | A | 12/1997 | Taniguchi ................... | 358/300 |
| 5,753,344 | A | 5/1998 | Jacobsen .................... | 428/142 |
| 5,812,152 | A | 9/1998 | Torigoe et al. .............. | 347/2 |
| 5,908,590 | A | 6/1999 | Yoshimi et al. ............. | 264/45.4 |
| 5,924,870 | A | 7/1999 | Brosh et al. ................ | 434/365 |
| 5,967,032 | A | 10/1999 | Bravenec et al. ........... | 101/211 |
| 6,060,003 | A | 5/2000 | Karszes ...................... | 264/1.34 |
| 6,073,854 | A | 6/2000 | Bravenec et al. ........... | 235/487 |
| 6,133,928 | A | 10/2000 | Kayashima et al. ........ | 347/171 |
| 6,144,496 | A | 11/2000 | Goto .......................... | 359/619 |
| 6,148,724 | A | 11/2000 | Hart et al. ................... | 101/182 |
| 6,195,150 | B1 | 2/2001 | Silverbrook ................. | 355/22 |
| 6,239,068 | B1 | 5/2001 | Tutt et al. ................... | 503/201 |
| 6,256,150 | B1 | 7/2001 | Rosenthal ................... | 359/619 |
| 6,373,637 | B1 | * 4/2002 | Gulick, Jr. et al. ......... | 359/619 |
| 2002/0038917 | A1 | * 4/2002 | McKee ....................... | 264/1.36 |

FOREIGN PATENT DOCUMENTS

| | | |
|---|---|---|
| EP | 0 818 708 A1 | 7/1997 |
| EP | 0 812 668 A1 | 12/1997 |
| EP | 1 014 169 A1 | 12/1999 |
| WO | WO 01/96079 A2 | 12/2001 |

* cited by examiner

*Primary Examiner*—Ricky Mack
(74) *Attorney, Agent, or Firm*—Kent A. Lembke; Hogan & Hartson L.L.P.

(57) ABSTRACT

A method of fabricating plastic products with an integrated Lenticular lens material that thermally protects the ink layer and outer lens surfaces of the Lenticular insert. A Lenticular lens material is provided with a Lenticular lens layer with an outer surface of optical ridges and an ink layer bonded to a transparent lens layer. A thermal protective substrate comprising opaque flexographic ink is applied to the ink layer. The application of the thermal protective substrate is completed using a coating unit of a lithographic press. A Lenticular insert is formed from the coated Lenticular lens material and the insert is positioned within a mold cavity. The object is formed by inserting a liquid plastic charge into the mold cavity. The thermal protective substrate insulates the ink layer. Concurrently, the portion of the mold adjacent the insert is cooled to a temperature below the deformation temperature of the optical ridges.

27 Claims, 6 Drawing Sheets

METHOD OF PROTECTING INK AND PROVIDING ENHANCED BONDING DURING MOLDING OF LENTICULAR LENS SHEETS IN PLASTIC OBJECTS

CROSS REFERENCE TO RELATED APPLICATIONS

This application claims priority from U.S. Provisional Patent Application No. 60/257,588 filed on Dec. 22, 2000. The entire disclosure of the provisional application is considered to be part of the disclosure of the accompanying application and is hereby incorporated by reference.

FIELD OF THE INVENTION

The present invention generally relates to the manufacture of plastic containers and objects, and more particularly, to a method of fabricating plastic objects having a lenticular lens sheet or insert. The fabrication method includes a process of bonding lenticular lens material to the constituent plastic of the container of object during molding processes without damaging the lenticular lens material.

BACKGROUND OF THE INVENTION

It is a growing practice to utilize conventional plastic molded cups and containers to display promotional messages and to increase the market value of the cups and containers by adding images of sports figures, movie and television personalities and other graphics. While the printing processes for producing these messages, images and graphics have improved in recent years with advances in printing technologies, the messages, characters, and other graphics have generally remained two dimensional, static and non-moveable. The expectations of purchasers of these containers continues to rise, and the general public continues to demand ever increasing and enhanced visual effects in all media. Specifically, the entertainment industry routinely licenses its proprietary images for use on cups, packaging, and containers of all types from plastic soda cups to popcorn containers and their lids. The entertainment industry uses bright colors and molded shapes extensively to excite and interest customers and collectors of these containers. There continues to be pressure from movie makers, sports promoters and others in the entertainment industry to develop new products to better capture the public's attention for their promotions and licensed products.

In addition to problems with creating more exciting imagery, there are design restraints faced by plastic cup and container manufacturers that must be addressed in creating any new product. For example, in the traditional plastic cup industry, the manufacturers are continuously struggling with the demands for a less expensive cup to make their use attractive as part of no-cost promotional campaigns (e.g., the cup is given away by a retailer with the purchase of soda, beer, or other beverage) and as a profitable standalone product. One method used to reduce cost is to reduce the amount or weight of plastic used in each cup by thinning the cup wall and other methods. Reducing the weight of plastic used reduces material costs and also makes the manufacturing (i.e., molding) of the cups faster and less expensive as the molds can be filled more rapidly and the plastic cools in a shorter time. However, the desire for less material weight and wall thickness must be balanced with the hoop strength of a cup to control the cup being squeezed shut or deformed. Hoop strength is typically measured by adding weights or pressure to a point near the top of the cup on the outer surface of the side wall and measuring the amount of deflection of the open end of the cup.

To further minimize the costs of containers, the inner and outer surfaces of the walls are typically kept smooth and their shape kept relatively simple to minimize mold costs. These smooth surfaces also have been required because the typical method of placing images and graphics on containers and other plastic objects is with standard printing processes, such as offset printing, that are most effective on smooth printing surfaces.

The inventors recognize the needs of the entertainment industry and understand the benefits of providing more visually appealing images and graphics as part of promotional containers and other plastic products. These plastic products are significantly improved by including a three dimensional ("3D"), action image provided with the use of Lenticular lens materials or sheets (i.e., interlaced segments of images combined with Lenticular lenses to provide a variety of visual effects such as motion, zooming in and out, and 3D effects).

The use of Lenticular lens material is known in the printing industry for creating promotional material and typically involves producing a sheet of Lenticular lens material and adhesively attaching the Lenticular lens material to a separately produced object for display. The production of Lenticular lenses is well-known and described in detail in a number of U.S. patents, including U.S. Pat. No. 5,967,032 to Bravenec et al. In general, the production process includes selecting segments from visual images to create a desired visual effect and interlacing the segments (i.e., planning the layout of the numerous images). Lenticular lenses are then mapped to the interlaced or planned segments, and the Lenticular lenses are fabricated according to this mapping. The Lenticular lenses generally include a transparent web which has a flat side or layer and a side with optical ridges and grooves formed by Lenticules (i.e., convex lenses) arranged side-by-side with the Lenticules or optical ridges extending parallel to each other the length of the transparent web. To provide the unique visual effects, ink (e.g., four color ink) is applied to or printed directly on the flat side of the transparent web to form a thin ink layer, which is then viewable through the transparent web of optical ridges.

While these Lenticular lens materials provide excellent visual effects, the use of adhesives and other attachment methods has not proven effective in producing high quality, long-lasting, and inexpensive plastic products. Because attaching the Lenticular lens material after producing the plastic cup or container is inefficient and relatively expensive, the plastic manufacturing industry desires a method for attaching the Lenticular lens material to plastic cups or containers as part of the cup or container manufacturing process. Unfortunately, the plastic manufacturing industry has not been able to overcome the problems associated with using common Lenticular lens material as part of standard plastic fabrication processes. The problems arise because plastic fabrication generally includes processes such as injection molding that involve heating raw plastic materials to a relatively high temperature (e.g., 400 to 500° F. or hotter) and then injecting the fluid plastic into a mold with the shape of the desired plastic object or by otherwise processing the molten plastic. The ink or ink layer has a chemistry that does not stay intact when the ink is heated to these high temperatures, and the image is destroyed or at least significantly altered.

To address this problem, the plastic manufacturing industry has made some attempts at protecting the ink layer from the high temperature molten plastics during injection molding processes. Typically, these attempts have involved applying a bonding and protective substrate of hot melt polyethylene to the ink or ink layer to provide protection from the molten plastics and to provide a bonding interface between the Lenticular lens and the plastic of the formed cup or container. The protective substrate material may be as thick as 2.5 mils or more to provide adequate thermal insulation for the ink layer.

While providing a generally effective bonding surface and providing some protection for the ink layer, the application and use of a protective substrate has not resolved all manufacturing problems facing the plastic manufacturing industry. For example, it has proven difficult and often expensive to apply the substrate to the ink layer at a thickness that adequately thermally protects the ink from the high temperature molten plastic during injection molding. Another ongoing challenge has been obtaining adequate opacity behind the lens and ink layer as needed to provide a sharp and colorful image. Typically, proper opacity has been achieved with the use of additional volumes (i.e., thicknesses) of material in the protective substrate which increases costs and adds to manufacturing difficulties of applying thick protective coats on the ink layer.

Another ongoing problem is the thermal protection of the Lenticular lens during the injection molding process. Although the Lenticular lens does not typically come in direct contact with the molten, injected plastic, the Lenticular lens is placed in the female portion of the mold and positioned against an outer wall of the mold. When the male portion of the mold is inserted and the hot plastic, i.e., at or near 500° F. is injected into the sealed mold, the female or outer portion of the mold increases in temperatures to approach the hot plastic temperature, such as in the range of 250 to 400° F. The serrated surface (i.e., the optical ridges and grooves formed by Lenticules) is a layer formed of APET, PETG, or other material that while having relatively good heat resistance may sometimes deform or flatten during the dwell time necessary to cool and form a cup or container. Of course, any flattening or deforming of these optical ridges can reduce the sharpness of the image or even ruin the focus of the Lenticular lens making the image appear fuzzy and out of focus.

Consequently, there is a need for an improved method of fabricating plastic containers and other objects that include Lenticular lens material mated to plastic. The method preferably addresses the need for a cost-effective method of applying a protective thermal substrate that also provides adequate opacity. Additionally, the fabricating method should be selected to provide improved protection for the Lenticular lens, and particularly, the optical ridges or serrated surface of the Lenticular lens, during injection molding processes to better maintain the focused effect of the lens and ink layer combination on the finished plastic product.

SUMMARY OF THE INVENTION

To address the above discussed design constraints and other needs of the plastic manufacturing and entertainment industries, the invention provides an efficient and economical method to produce plastic objects, such as containers, with Lenticular material included as an integral insert (i.e., a Lenticular insert). Significantly, the method provides techniques and features that enhance the achieved image by using an opaque ink for a thermal protective substrate and that reduce the cost of manufacturing the insert by utilizing the coating unit of a lithographic press (rather than a standard ink application unit). Further, the method is designed to provide thermal protection for both sides of the Lenticular insert, i.e., ink used for creating an image and optical ridges formed in an exterior surface of a lens layer. The method produces a plastic object with the features of 3D graphics and/or animated video clips showing a fraction of a second to up to several seconds when viewed through the Lenticular insert from the outer surface of the plastic object.

The Lenticular insert that provides the unique visual imagery includes Lenticular material having optical ridges and grooves on an outer surface and a layer or transparent web of lenses, which together create a relatively rigid material with air passages or voids. A layer of ink is attached to the flat side of the transparent lens layer (and in one embodiment, a bonding primer layer is first applied to the transparent lens layer to enhance bonding). The actual images are pre-printed in this ink layer on the back side or second surface of the pre-extruded or post-embossed plastic lens material, which may be made of a variety of plastic materials including APET, flexible or rigid PVC, styrene, and PETG. The images are interlaced corresponding to the frequency of the Lenticular lens material (i.e., the optical ridges and grooves and the transparent lens layer) and are then printed using offset lithography, web, letterpress, digital, screen, or any other printing process.

According to one aspect of the invention, a method of fabricating plastic products is provided that is effective at integrating Lenticular lens material into the produced plastic product in a cost effective and efficient manner that thermally protects the ink layer of the Lenticular insert. In this method, a Lenticular lens material is provided that is made up of a Lenticular lens layer with an outer surface of optical ridges and an ink layer bonded to a transparent lens layer. A thermal protective substrate comprising ink is applied to the ink layer. In a preferred embodiment, the protective ink is an opaque flexographic ink which enhances the achieved image by providing an opaque background for the ink layer.

Significantly, the use of flexographic ink allows the application of the thermal protective substrate to be achieved using the coating unit of a lithographic press (which enables the efficient application of a thick layer of ink which controls the number of applications required). A Lenticular insert is then formed from the coated Lenticular lens material and the insert is positioned within a mold cavity of a plastic molding assembly. The object is then formed by operating the molding assembly to insert a liquid plastic charge into the mold cavity. The liquid plastic may be in the range of 300 to 700° F. and the thermal protective substrate is selected with a thickness ranging from 0.5 to 2 mils to thermally insulate the ink layer from the molten plastic. In one embodiment, a further bonding layer is applied to the thermal protective substrate (such as a UV-curable primer coating or orient polypropylene (OPP)) to increase thermal protection of the ink layer and to enhance bonding between the Lenticular insert and the liquid plastic.

According to another aspect of the invention a method of manufacturing a plastic product with a Lenticular insert is provided that provides thermal protection for both sides of the Lenticular insert during plastic molding operations. The method involves providing a Lenticular insert having a Lenticular lens layer with a first surface of optical ridges and a second surface and an ink layer bonded to the second surface of the Lenticular lens layer. To thermally protect the ink layer, the ink layer is encapsulated with a thermal protective substrate such as an opaque, white UV-curable ink or a hot melt polyester, polypropylene, polyvinyl chloride, or vinyl. The Lenticular insert is positioned within a mold cavity defined by an outer mold body and a center die. The combination of these components defines the dimensions of the plastic product by providing flow paths for liquid plastic. The Lenticular insert is positioned within the mold cavity with the optical ridges adjacent and in heat transfer contact with an insert contacting region of the mold body. Liquid plastic is filled into the mold cavity at a plastic processing temperature (e.g., 300 to 700° F.) which causes the center die to be heated to a first operating temperature (e.g., 250 to 400° F.).

The method continues with the unique feature of cooling the insert contacting region of the mold body to a second operating temperature which is less than the first operating temperature and also less than about a predetermined deformation temperature of the optical ridges. In one embodiment, the optical ridges are fabricated from APET and the deformation temperature is about 170° F. and in another embodiment, the optical ridges are fabricated of PETG with the deformation temperature being about 160° F. Thus, the second operating temperature is significantly lower than the first (inner) operating temperature which thermally protects the optical ridges during the dwell steps of forming a plastic object. The first insert contacting region can be thought of as all of the mold body adjacent the optical ridges or a slightly larger or smaller area depending upon the desired results of the Lenticular insert (i.e., whether it is preferable to have a sharply focused image even at edges or to have a very secure bond and plastic frame at edges with possibly blurred edges, respectively).

Other features and advantages of the invention, including a Lenticular insert with an ink thermal protective layer and an inner and/or outer bonding layer, will be seen as the following description of particular embodiments of the invention progresses in conjunction with references to the drawings.

DESCRIPTION OF THE DRAWINGS

The accompanying drawings, which are incorporated in and from a part of the specification, illustrate preferred embodiments of the present invention, and together with the descriptions serve to explain the principles of the invention. In the Drawings.

DETAILED DESCRIPTION OF THE INVENTION

Figure 1:
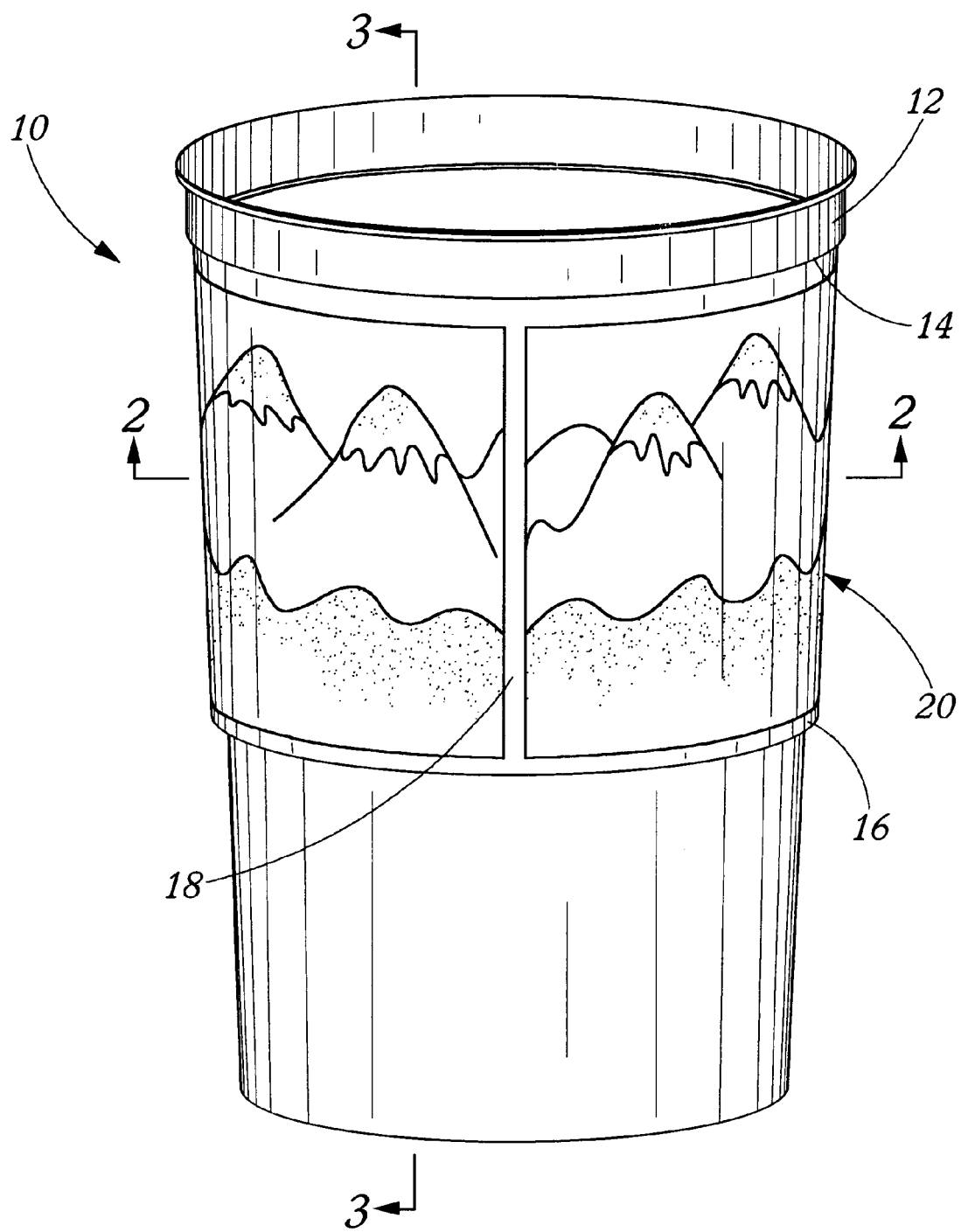
FIG. 1 is a perspective view of a plastic, molded cup with a Lenticular lens insert bonded to the outer wall according to one preferred method of the present invention.

The invention described in the following discussion and in the following claims is directed specifically to methods of more effectively providing thermal protection for the ink layer that produces an image and for improving the visual effects produced by the Lenticular insert (lens and ink layer combination) bonded within or on a plastic container or object. The inventors recognize that a protective layer installed for thermal protection of the ink layer can be selected to also improve the sharpness of the image by providing a desired opacity while also being installed or positioned efficiently and at an acceptable cost. In this regard, the following description will detail the use of an additional ink layer with a desired opacity and thickness as a protective thermal layer for the image or four color ink layer of the Lenticular insert. Significantly, the inventors not only identified the advantages of utilizing ink as a protective layer but also determined that standard ink application units are inefficient at applying a desired thickness. To enhance the ink application process, the inventors created a process of applying the thermal ink layer to the image ink layer of the Lenticular insert using a coating unit of a lithographic press to obtain a desired thickness of ink (such as 0.5 mils to 2 mils). Prior to the described invention, ink would not have been applied with such a coating unit but instead prior art devices most likely would use a standard ink application unit.

Additionally, the inventors determined that during injection molding thermal protection can effectively be provided for the ridge surfaces of the outer surfaces of the Lenticular insert to reduce chances of deforming these ridges and harming the focus of the Lenticular insert. Deformation during these injection processes was an unexpected problem, but in practice flattening of the ridge surfaces of the Lenticular insert can occur when the outer walls of the female or outer mold section contacting the ridge surfaces heat up to 250 to 400° F. during the dwell times required to form the container. To address this problem, the process described below includes controlling the temperature of the two parts of the injection mold (i.e., the female or outer portion and the male or inner portion) to remain within two different temperature ranges. More particularly, the outer portion (or at least the regions contacting the ridge surfaces) is typically held below a predetermined deformation temperature (e.g., about 170° F. when the outer ridges are formed of APET) while the inner portion is allowed to heat to temperatures useful for proper curing of the injected plastic (such as about 350° F.). The use of two differing temperatures for the mold sections is not suggested in prior plastic molding processes as it is standard practice to allow both portions to heat up to similar temperature ranges to insure consistent curing of the injected plastic throughout the produced container or object.

To provide a thorough background for these inventive manufacturing processes, the following description first discusses the inventive plastic objects according to the invention that have an integral image visible due to a Lenticular insert that is included as an integral part of the plastic object. From the discussion of features of a container fabricated according to the invention, the discussion proceeds to a full discussion of the method of fabricating plastic objects having a Lenticular insert integrally bonded to the plastic that forms the body, walls, or some other portion of the object. The discussion specifically explains the steps in fabricating a container with a Lenticular insert bonded to an outer wall. Of course, these same or similar steps within the breadth of the method of the invention can be employed to fabricate any number of other plastic objects having a Lenticular insert.

Figure 2:
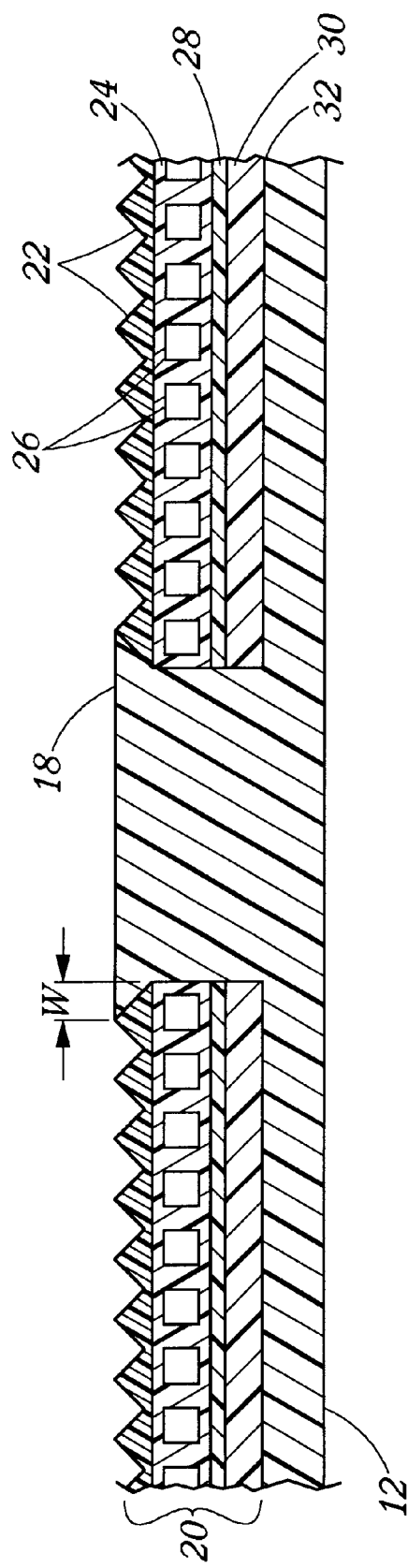
FIG. 2 is an enlarged, partial sectional view of the cup of FIG. 1 taken along line 2—2 illustrating the layers of the Lenticular insert including a bonding and thermal protection layer according to the invention and illustrating the framing feature of the present invention at the seam of the Lenticular insert.
Figure 3:
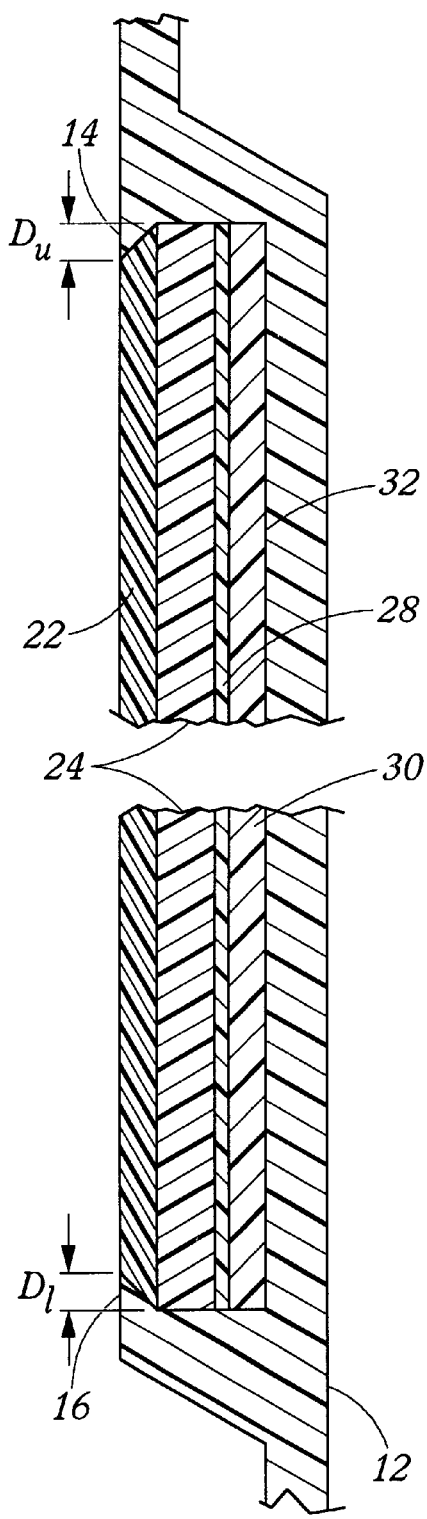
FIG. 3 is an enlarged, partial sectional view of the cup of FIG. 1 taken along line 3—3 illustrating the upper and lower portions of the frame feature of the invention.

Referring now to FIGS. 1–3, a container 10 according to the invention is illustrated. As will become clear, the container 10 includes a number of features that specifically address problems that the plastic manufacturing industry has faced in container design and provides other beneficial features. According to one important aspect of the container 10, a Lenticular insert 20 is included and attached to an outer wall 12 of the container 10 to provide a number of desirable structural and heat transfer characteristics as well as enhanced visual effects on the container 10. The Lenticular insert 20 typically functions to provide an image with 3D features, movement, zoom in and out, and other characteristics. In this regard, the Lenticular insert 20 preferably extends substantially around the entire periphery of the wall 12 covering a large portion of the outer wall 12 surface area. To provide enhanced imagery, the Lenticular insert 20 includes Lenticular lens material and ink which can be thought of as comprising three layers of material, as shown in FIGS. 2 and 3: an outer surface layer of optical ridges 22 with corresponding optical grooves, an interior, transparent layer 24 having numerous lenses forming air channels 26 in the layer 24, and an ink layer 28 printed onto the flat surface of the transparent layer 24. Additionally, a bonding and thermal protection layer 30 is bonded to the ink layer 28 to provide a bonding surface with the outer wall 12 of the container 10 and to thermally protect the ink layer 28 during plastic fabrication processes (both functions will be discussed in detail in connection with the container fabrication process).

The extruded lens material of layer 24 and ridges 22 is generally made of PETG, APET, PVC, OFP, or any other plastic that has a good quality refractive index. During fabrication, the lens material (i.e., the flat surface of layer 24) may be pre-coated with a primer to ensure better adhesion of the ink 28 throughout the process of fabricating the container 10 (explained below in connection with FIG. 4). This primer may be water-based, solvent-based, or UV-curable. Excellent ink 28 adhesion is critical, as the ink must hold to the transparent layer 24 for the entire container fabrication process. The pre-coating with a primer may be done via web or sheet fed operations or other suitable application methods.

During fabrication of the Lenticular insert 20, the pre-extruded lens materials 22 and 24 is then printed upon the reverse side or second surface of layer 24 via web or offset press operations to form ink layer 28. The lens layer 24 is printed with corresponding interlaced images in conjunction with the appropriate mathematics of the lens materials 24 and 22. The mathematics preferably not only matches the lens materials 24 and 22 but also the distortion caused by the final shape of the piece (i.e., often not a flat surface). In the case of a cup or other conical shaped object, the lens or optical ridges 22 "open up" and create a new mathematical pitch. This pitch is predetermined before plates are made and printing occurs so that the Lenticular insert 20 can be viewed in its final form. As a result of this process of accommodating for non-planar surfaces or orientations, the image or images on the Lenticular inserts 20 may not appear correctly (i.e., will be distorted) when coming off of the printing equipment in flat sheets or web form. The use of a relatively large Lenticular insert 20 relative to the surface area of the outer wall 12 serves several important purposes. As discussed previously, the manufacturers of plastic containers and cups are continuously searching for container and cup designs that reduce manufacturing costs by reducing material costs. In this regard, the Lenticular insert 20 is preferably a substantially rigid sheet of plastic material having an overall thickness of about 8 mils to about 25 mils or more (depending on the materials used and the complexity of the images created) that when inserted into the outer wall 12 of the container 10 acts to enhance the strength of the container 10. Due, at least in part, to the optic ridges 22, the Lenticular 20 creates a mechanical support which, when over-molded by the plastic resin of the outer wall 12 as a backing, supports and stiffens the outer wall 12 of the container 10, thereby giving the container 10 increased hoop strength. One benefit of this improved hoop strength is that the material costs of the container 10 can be maintained while obtaining a container 10 with improved hoop strength. More likely and more preferably, the size of the Lenticular insert 20 is large enough that raw plastic equal or greater than the volume of the Lenticular insert 20 can be omitted during the fabrication of the outer wall 12 in places where the Lenticular insert 20 is positioned because the insert 20 provides more than sufficient strength to account for the omitted wall 12 material. The resulting, lighter (in plastic) container 12 has the same or better hoop strength than a standard container without an insert and with a larger amount of plastic in the outer wall 12. Of course, the desirability of a container 10 with increased hoop strength will be obvious to any consumer who has held a full plastic cup of liquid and been concerned that if they hold it anywhere near the open end that the liquid will be squeezed out of the container 10.

In traditional cups or containers, the side wall of each cup is smooth so that it can be offset print and because any grooves added to provide a consumer a better gripping surface significantly increase the cost of the mold (and make printing on the wall difficult or impossible). By including the Lenticular insert 20 on the outer wall 12 with printing already in place on the side wall of a cup, the optical ridges 22 function to enhance the ability of a consumer or user to grip the outer wall 12 of the container 10 by providing a relatively rough gripping surface while eliminating any printing problems associated with rough surfaces because the Lenticular insert 20 is "pre-printed." Additionally, the optical grooves help to collect and remove or drain any condensation on the outer surfaces of the cup wall that might make it more difficult for a user of the container 10 to grip the outer surface of the outer wall 12. In this manner, the Lenticular insert 20 can be thought of as an inserted or attached gripping surface to the container 10.

The Lenticular insert 20 preferably is configured to provide a thermal barrier or layer of lower heat transfer rates compared with a standard plastic container outer wall. This typically includes some air or other gas passages or simple air grooves rather than only solid layers of plastic material. In this regard, a number of lens layouts and configurations may be used (e.g., more irregular than the air channels 26 shown in FIG. 2). As illustrated, a preferred embodiment of the Lenticular insert 20 includes the air channels 26 which typically contain air and which create an effective thermal barrier on the outer wall 12 of the container 10. This thermal barrier created by the Lenticular insert 20 functions to reduce heat transfer from and to the contents of the container 20, which enhances the container's usefulness for hot and cold service (i.e., holding hot and cold liquids). In a preferred embodiment, about 35% or more of the outer wall 12 surface area is covered by the Lentincular insert 20 to provide the thermal barrier.

According to another important feature of the container 10, the container 10 includes a framing system or picture frame of plastic material that functions to physically bond the Lenticular insert 20 to the outer wall 12 of the container 10. The framing system further eliminates seams between the mating edges of the Lenticular insert 20 and rough mating surfaces or seams between the Lenticular insert 20 and the outer all 12. By providing these functions, the framing system overcomes structural weaknesses that may be present at the seam where the Lenticular insert 20 mates when rapped around the container 10. This strength problem, which can lead to cracking, is a significant concern in conical or frustoconical shaped objects such as a typical plastic cup. In general, the framing system comprises an overlap of plastic material over each of the side edges of the Lenticular insert 20. As illustrated in FIGS. 1–3, the framing system includes an upper frame member 14 overlapping the upper edge of the Lenticular insert 20 on the optical ridges 22 for a depth, $d_U$, and a lower frame member 16 overlapping the lower edge of the Lenticular insert 20 on the optical ridges 22 for a depth $d_L$. As illustrated, a preferred embodiment of the container 10 is configured such that the side edges of the Lenticular insert 20 are slightly spaced apart (i.e., for a distance of about ¼ inch or less). This space is filled with a seam frame 18 that overlaps the Lenticular insert 20 on optical ridges 22 for a width, w.

The frame members 14, 16, and 18 can take a number of shapes which are typically defined by the mating surface of the optical ridge 22, and may be, as illustrated, a beveled member with a triangular cross-section. The frame members 14, 16, and 18 preferably are fabricated from the same material as the outer wall 12 and are bonded to the outer wall 12. Typically, this bonding will occur as part of the fabrication process when the frame members 14, 16, and 18 are formed during the same process as the outer wall (e.g., injection of the plastic into a mold cavity) or will occur when the outer wall 12 is formed if the frame members 14, 16, and 18 are performed in a separate process step (i.e., form the frames members 14, 16, and 18 and bond them to the Lenticular insert 20 prior to forming the outer wall 12). The amount of the overlap, w, $d_u$, and $d_l$, will depend on a number of factors such as the weight and the thickness of the Lenticular insert 20 and the strength characteristics of the material used for the frame members 14, 16 and 18. In one embodiment, the overlaps, w, $d_U$, and $d_L$ are the same and are approximately 0.060 inches or less, but it should be understood that these overlaps may differ from each other (e.g., w may be less than or greater than $d_U$, and $d_L$ or vice versa) and may by larger than used in this embodiment.

In other embodiments not illustrated, the potential weakness in the container 10 where the Lenticular insert 20 butts together is handled differently. In one alternate embodiment, a bevel is formed on each side edge of the Lenticular insert 20. The beveled edges have a shape (e.g., a 45° bevel) to provide good strength characteristics and preferably have an adequate depth to provide an overlapping mating surface that provides increased structural strength. In one embodiment, the depth of the overlap is equal to the thickness of the Lenticular insert 20. The beveling can be achieved in a number of ways such as by shaving off part of the material of the Lenticular insert 20 on both side edges creating a beveled overlap. In another alternate embodiment, a "zipper" like structure is created at the seam formed between the side edges of the Lenticular insert 20. The zipper pattern formed on each side edge of the Lenticular insert 20 is positioned and mated together prior to fabrication such as in the mold cavity for the container 10 (or before the part is placed in the mold cavity). Clearly, a large number of other interweaving shapes and mating techniques may be used to practice the invention and obtain the beneficial features of the container 10 (i.e., overcoming the weakness inherent in a butt joint between the side edges of the Lenticular insert 20).

As a result of the features discussed above, the container 10 is a durable, one-piece part with excellent graphics, improved physical strength characteristics, a thermal barrier, improved gripping, and reduced plastic material costs and manufacturing time costs. While a cup was shown for the container 10, it should be understood that the shape of the container that may be fabricated to obtain some of the above benefits may vary widely, with one of the key features being the addition of the Lenticular insert 20. In this regard, the Lenticular insert 20 was illustrated with a specific 3-layer embodiment for clarity of description, but Lenticular materials and lens material with myriad configurations are readily available and many, if not all, of the available configurations may be used as the Lenticular insert 20. These substitutions are considered within the breadth of the invention and would only require minor changes to the design of the containers 10 (such as change in the length of overlaps in the framing system and the like). With an understanding of the unique features of an object (i.e., the container 10) that includes a Lenticular insert on an outer wall, it now will be useful to fully discuss the method of making containers (and other objects) according to the invention. Significantly, the following method of fabrication provides a unique method of bonding a Lenticular insert to molten plastic wherein the ink or ink layer 28 and the optical ridges 22 of the Lenticular insert 20 are not ruined or altered by exposure to high processing temperatures.

Figure 4:
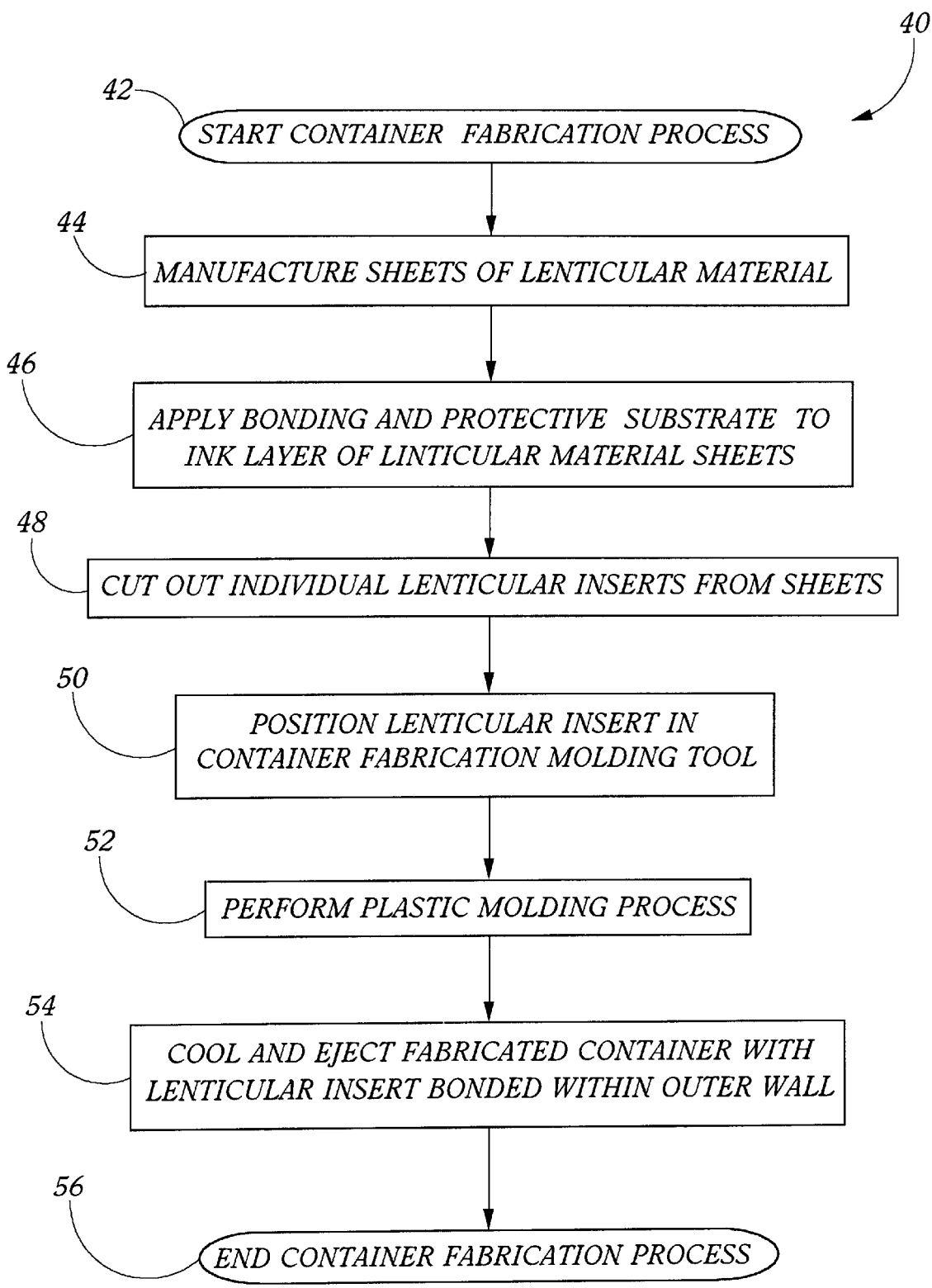
FIG. 4 is a flow chart illustrating the general process steps of a container fabrication method according to the invention.

Referring now to FIG. 4, the general steps and features of a method 40 of fabricating a container (such as container 10 of FIG. 1) is illustrated. The fabrication method 40 starts at 42 with the general planning of the visual imagery to be provided with a Lenticular insert and the size, shape, and material of the container upon or within which the Lenticular insert will be bonded. For the following example, the fabrication of container 10 of FIG. 1 will be discussed with the bonding of the Lenticular insert 20. Once this beginning planning step 42 is completed, the fabrication method 40 continues at 44 with the manufacture of a sheet of Lenticular material. The physical design and make up of these sheets was discussed above in connection with the configuration of the Lenticular insert 20 of the container 10 and can be seen FIGS. 2 and 3. Typically, the Lenticular material sheet will include transparent plastic optical ridges 22, a transparent lens layer 24 or web, and an applied ink or ink layer 28. The actual printing of the Lenticular piece may be 3D or animated and the lens format (e.g., the combination of ridges 22 and layer 24) may be vertical or horizontal. in a vertical format, 3D images and movement can be viewed, while with the horizontal format only motion will be viewable. The fabrication of Lenticular material sheets as in step 44 is well known by those skilled in the printing arts and does not need to be discussed in depth at this point. Lenticular material fabrication is described in U.S. Pat. No. 5,967,032 to Bravenec et al. and U.S. Pat. No. 5,753,344 to Jacobsen which are incorporated herein by reference. Additionally, the method of laying out or arranging inserts (or labels) for a conical container such as container 10 is illustrated in FIG. 1 of U.S. Pat. No. 5,908,590 to Yoshimi et al., which is incorporated herein by reference, which is directed to producing labels for foamed resin containers. In this manner, the patterns for a number of Lenticular inserts can be arranged on a large sheet of Lenticular material that can be further processed within the same processing line or in a separate processing system.

The next step of the container fabrication process 40 is to ensure that Lenticular inserts 20 cut from the Lenticular material sheet produced in step 44 can bond to the liquid plastic in a mold (i.e., during step 52 of process 40) or other plastic fabrication or processing step. The inventors recognize that there are two significant problems to overcome in using Lenticular material as an insert in the plastic fabrication process 40. First, the printing ink used in typical Lenticular material sheet manufacturing processes does not have chemistry compatible to bond to the hot (e.g., approximately 500° F.) plastic, such as the plastic used to form the outer wall 12 of the container 10. Second, even if the ink in layer 28 was able to bond to the plastic, the inks used to print layer 28 on the Lenticular material sheet are typically not able to hold up to high temperatures experienced in standard molding processes such as injection molding and blow molding and are ruined or substantially degraded.

According to an important aspect of the invention, the container fabrication process 40 includes unique processes that protect the applied ink 28 from the high temperatures and that also provide a bonding surface between the Lenticular material in the produced sheet and the molten plastic used to form the outer wall 12 of the container 10. As background, it previously believed that one method of providing these protection and bonding features would be to employ the hot melt polyethylene chemistry typically used in the film laminating industry. Consequently, manufacturers first attempted to find a way to place a layer of hot melt polyethylene over the ink side 28 of the lens material 22 and 24. Unfortunately, this technique presented problems as the temperature required for flow out of the polyethylene onto the pre-printed Lenticular lens material sheet destroyed the ink 28 on the lens material layer 24 or at the very least loosened its bond to the lens material layer 24.

Figure 6:
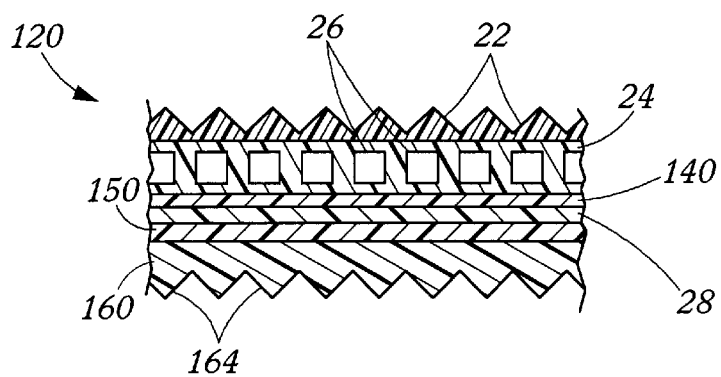
FIG. 6 is sectional view of a Lenticular insert similar to that of FIG. 2 illustrating a Lenticular insert that utilizes a thermal protective substrate comprising ink combined with an inner primer bonding layer (between the image ink layer and the transparent lens layer) and an outer primer bonding layer for bonding with raw, molten plastic.

In response, the inventors identified a preferred method of protecting the four-color ink placed on the lens material layer 24 and also of creating a bond between the Lenticular insert and the liquid or molten plastic injected during the injection molding process. A cross-sectional view of a Lenticular insert 120 manufactured by this preferred process is illustrated in FIG. 6. As illustrated, the Lenticular insert 120 includes the optical ridges 22 and the transparent lens layer 24 with air channels 26. An optional primer coat 140 can be applied as part of the manufacturing step 44 and the four-color ink layer 28 is applied to the primer coat 140. The primer coat 140 while optional enhances bonding of the ink layer 28 during throughout the injection molding process. In one preferred embodiment, the primer coat 140 is a lithographic, UV-cured primer coat of a material that is transparent and enhances the bond between the ink materials and the flat side of the lens layer 24. For example, but not as a limitation, the primer coat 140 may be a primer product available from Northwest Coatings under product number LX-3.). In addition to UV-cured primer, this primer coat 140 may be water-based or solvent-based. The pre-coating with the primer material may also be done via web or sheet fed operations or any other suitable application methods. The four-color or other utilized ink is then applied to the primer to form the ink layer 28 (on the primer coat 140 or directly on the transparent lens layer 24).

Figure 7:
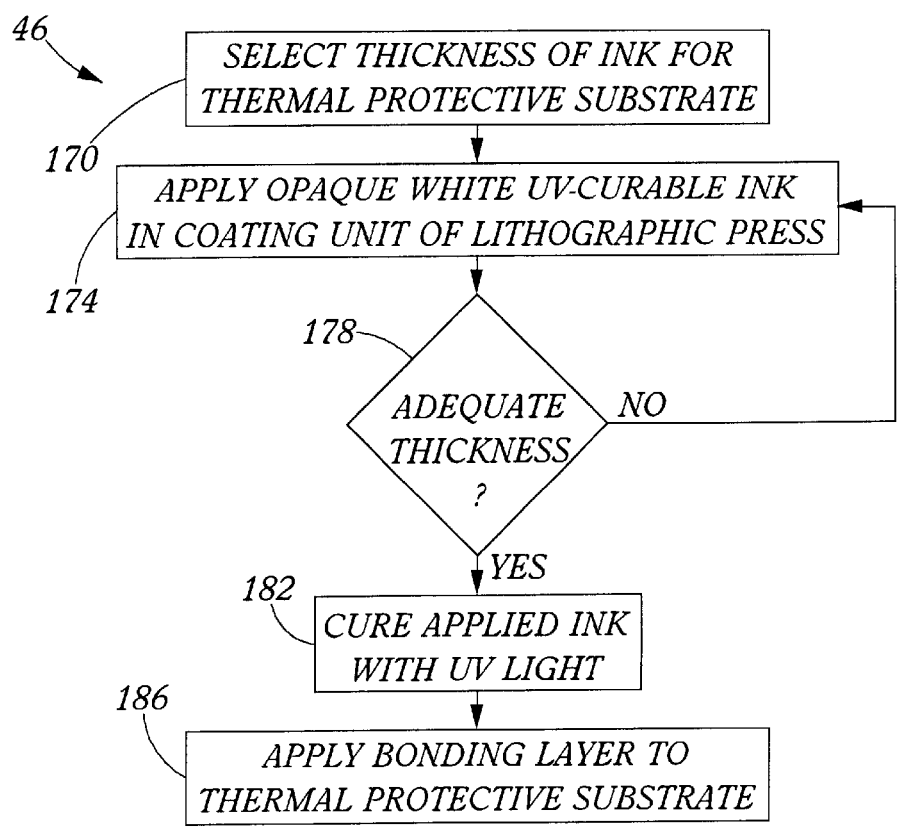
FIG. 7 is a flow chart illustrating an embodiment of applying the thermal protective substrate to the image ink layer that is particularly useful when the substrate comprises a flexographic ink.

Referring now to FIG. 7, a preferred embodiment of step 46 is illustrated for applying a protective thermal ink layer 150 to and over the image ink layer 28. The inventors determined that in many applications there are needs for a thermal protection layer that also provides a desired level of opacity. This substantially opaque thermal layer 150 is useful for enhancing the color and 3-D effect created by the image ink layer 24 with the lens 24 and ridges 22. However, as discussed previously, the protective thermal substrate 150 preferably also provides adequate thermal protection and generally, a good bonding surface with the wall 12. In one embodiment of the invention, all of these features are provided by applying one or more layers of white ink to the image ink layer 28 to form the thermal protection substrate 150 (as shown in FIG. 6).

The specific steps of applying this protective substrate 150 are shown in FIG. 7. At 170, a thickness is selected for the ink material used to form the substrate 150. The selection of the thickness may vary depending upon the configuration of the plastic object being produced and on other factors, such as the type of ink chosen, the temperatures used for injecting the plastic to form the wall 12, and the desired opacity of the substrate 150. In one preferred embodiment, the ink used to form the substrate 150 is flexographic ink that is substantially opaque when cured with UV radiation or light (but the chemistry of the ink preferably does not include silicate because silicon chemistry may inhibit bonding during the injection molding process). The thickness of the substrate 150 for this type of ink generally ranges from about 0.5 mils to 2 mils (although thinner and thicker substrates 150 may be useful in some applications) with a more preferred thickness of about 1.5 mils.

At step 174, the ink is applied to form the substrate 150. While the ink may be applied using flexography, rotogravure, screen printing, or other processes, the inventors have determined that the ink (and particularly, flexographic ink) can be applied successfully and efficiently with a coating unit of a lithographic press (e.g., not a normal ink unit as would typically be used to apply ink). The use of coating units is beneficial because the coating units have the ability or capacity to apply down a thicker layer of ink per application then other units or processes which enhances efficiency and lowers manufacturing costs. Flexographic ink is useful in this regard because its chemistry allows it to be applied with physical techniques rather than more time consuming and expensive chemical methods (however, note that flexographic ink generally is not useful with normal ink units using plate and lithography chemistry and is difficult to flow through an ink train in a printing unit). During practice, an anolox roller can be used to transfer the ink to a blanket and then to the image ink layer 28 in a thickness typically ranging from 0.5 to 2 mils. The viscosity of the flexographic ink can be readily adjusted to fit the mechanical anomalies of the particular coating unit, such as coating units available from Heidelberg and from Komori.

Because more than one application of ink may be needed, at 178 the process 46 continues with verifying if the ink is at an adequate thickness and if not, repeating the ink application process at 174. At 182, the applied ink is cured with the application of UV light to finalize the forming of the thermal protective substrate 150. In some embodiments, this step 182 is not needed because differently cured ink is utilized for the substrate 150. Further, in other embodiments, step 182 is the final step in the process 46 as the ink selected provides not only the needed thermal protection but also the bonding surface needed during injection molding.

In some embodiments, however, it may be desirable to increase the effectiveness of bonding by proceeding with step 186 which involves applying the bonding layer 160 to the thermal protective layer 150. The bonding layer 160 is preferably fabricated of a material that can be easily applied to the thermal protective layer 150 and that provides good bonding with the molten plastic during injection molding. While a number of materials may be used, a primer coating similar to layer 140 is preferably applied, such as UV curable primer (e.g., LX-3 product available from Northwest Coatings). The thickness may vary to provide adequate bonding, with 1 to 2 mil thickness typically being satisfactory. Additionally, this coating provides additional thermal protection to the four-color ink 28 and may be utilized to reduce the required thickness of the thermal protective substrate 150.

To further bonding with the molten plastic of wall 12, the bonding layer 160 may be fabricated to include a textured surface to increase the bonding surface area on bonding layer 160. This textured surface may be obtained during the application of the bonding layer 160 or by mechanical methods after the layer 160 is cured. In one embodiment, another layer of material is applied (e.g., a texture bonding layer) to provide the bonding ridges 164. For example, oriented polypropylene (OPP) with a polyethylene hot melt layer or other material with good bonding properties (with the layer 160 material and wall 12 material) can be applied (lamination and its related techniques are discussed in detail below in relation to applying a bonding substrate). The thickness of this texture bonding layer may be varied in successfully practicing the invention, and in one embodiment, the thickness ranges from about 1.5 to 3 mils. In another embodiment, OPP is used instead of the primer material for layer 160 and applied directly to the thermal ink substrate 150.

In another embodiment of process 40, step 46 involves applying a thermal protective substrate by taking the pre-printed lens sheets from step 44 and encapsulating the ink layer 28 on the back of the lens material 24 with a hot melt or pressure-sensitive polyester polypropylene or PVC vinyl to form a protective substrate 30 or 150. The film is placed over the four-color ink layer 28 completely encapsulating the ink layer 28 and providing a suitable bonding surface in the injection molding process as well as a thermal barrier against the molten plastic of wall 12. Alternatively, the encapsulating technique may involve use of a pressure sensitive PVC, polypropylene, or other material that is compatible with the injection molded plastic to create a permanent or effective bond.

According to alternative embodiments of the method 40 with reference again to FIGS. 1–5, other methods may be used to achieve application of a bonding and protective substrate 30 to the ink layer 28 of the produced Lenticular material sheet. In one embodiment, this application process 46 involves first coating in web form in a toll coating operation hot melt poly material to a carrier or throwaway liner (not shown) and then second, applying or bonding the hot melt poly material to the printed lens material (i.e., to ink layer 28) in a separate process or substep. Significantly, this second step can be accomplished at much lower temperatures than with hot melt flow techniques. The temperatures required for activation may vary with the materials used for the hot melt poly and the carrier or liner and their thickness but in a preferred embodiment the activation temperature is in the range of 190° to 250° F., and more preferably in the range of about 210° to 220° F. This second step functions to form the bonding and thermal protection substrate 30, as illustrated in FIGS. 2 and 3, which is firmly and substantially permanently bonded to the ink layer 28. Polyester compounds may be used for the carrier or liner may be utilized as the carrier because polyesters easily stand up to the heat in the hot melt coating portion of step 46 (i.e., a prefab substep completely prior to applying the substrate 30) but, of course other materials may be utilized for the liner. The inventors have found this prefab substep process to be efficient and economical because of the low material costs and because it can be run or completed at high speeds.

Since the hot melt poly is later applied or bonded to the Lenticular material sheet (against ink layer 28) in a separate operation, the polyester carrier or liner (not shown) preferably has the characteristics of quick and non-damaging release liner. In other words, the side of the liner in which the hot melt poly is applied preferably should have a low surface tension so that the hot melt poly does not permanently mate to the polyester or other material of the liner. To attach or bond the hot melt-liner combination, i.e., the laminate, to the Lenticular material sheet, the backside of the liner (i.e., the portion away from the Lentincular material sheet) is heated as the entire laminate is placed with pressure onto the back side (the printed side 28) of the Lenticular lens material sheet.

More specifically, in one embodiment, the carrier or release liner is manufactured from a polyester material that can withstand the heat generated from the web coating process used to coat the polyester liner with the hot melt poly. During the web coating process, the polyester liner is coated with a polyethylene blend at about 400° F., which is a high enough temperature to achieve flow of the resin. Approximately 0.5 to 3 mils of polyethylene is placed on the polyester liner with the thickness accurately measured and controlled. More preferably, the thickness of the hot poly (which becomes the bonding and thermal protection substrate 30) is 2.5 mils to provide an adequate thermal barrier for the ink 28 and a good anchor and bonding surface on the Lenticular insert 20. During the lamination process, the polyester of the liner is heated so that the opposite side (i.e., the polyethylene) is heated to the temperature point of becoming semi-liquid and sticky or tacky. The polyethylene typically begins to transform at about 180° F. and the window or range for proper lamination is generally between 190 and 300° F. In one operating mode of the invention, polyethylene (with polyester liner) is applied to the ink 28 side of the Lenticular insert 20 at temperatures between about 220 and 250° F. at application or feed rates of about 100 to 200 feet per minute. As a result of this application process, the laminate and the Lenticular material sheet from into one piece. Next, either in line with the process or after sufficient cooling, the throw away liner portion of the laminate is removed from the Lenticular material sheet leaving a very accurately measured amount of hot melt material bonded over the ink 28, thereby forming the bonding and thermal position substrate 30 of the Lenticular insert 20.

In one embodiment, the above described lamination process is used to apply the textured (or untextured) bonding layer 160 to the thermal ink substrate 150 in the Lenticular insert 120 shown in FIG. 6. The preferred equipment for the lamination process is a lamination machine provided by Bellhoffer but other lamination machines and equipment may be useful to manufacture the insert 120. In one preferred embodiment, the laminate material used to form bonding layer 160 is a clear oriented polypropylene material (OPP) and the layer 160 has a resulting thickness selected from the range of about 1.5 to 3 mils. Typically, the OPP material can be obtained coated with low-melt polyethylene that "wets out" at between 185 to 230° F. and can be effectively applied at a rate of 2 to 200 feet per minute.

In order to do this as an in-line process, sufficient cooling may be achieved by placing the laminate and Lenticular material sheet over a chill roller for a cooling period before the liner is removed to leave the hot melt 30 intact over the ink 28. In one embodiment of the fabrication method 40, the liner has a silicon treatment (or alternatively, some other type of release chemistry may be used) applied to the side of the liner that mates with the hot melt poly to allow the liner to readily release from the hot melt poly 30 and stay attached to the ink 28 in the process. One reason that this process works well is due, at least in part, to the fact that the temperatures required to activate the hot melt poly for bonding to the ink 28 are only around 200° F., whereas to get poly material to flow out in prior art methods of thin film laminating requires much higher temperatures that would be detrimental to the ink used in the Lenticular material sheet. The type of equipment used to perform above steps may be a Bellhoffer, D K or any type of thermal laminator with higher speed laminator devices being preferred to reduce manufacturing costs.

Because the substrate application step 46 is a key feature of the method of the invention, it may be helpful to more fully discuss the application of the substrate 30 and to discuss alternative processes that may be used as part of step 46. After the Lenticular material sheet is manufactured in step 44 (i.e., pre-coated and printed, yet still in sheet from or roll form), the sheet can be laminated with a variety of substrates to provide the bonding and thermal protection features of the invention. In this regard, the in-mold process (i.e., plastic molding process 52) generally requires that the inks 28 are protected, and according to the invention this is achieved by placing a substrate 30 between the inks 28 and the hot molding material (the molten plastic) used to form the outer wall 12 of the container 10. As previously discussed, this molding material may be polypropylene, styrene, polyethylene (such as HDPE), PVC, or a number of other plastics that are suitable for use in injection and blow molding processes. Consequently, the substrate 30 applied in the above discussed hot melt poly-liner process 46 in some embodiments comprises a material that readily bonds to these plastics such as, but not limited to, polypropylene, polyester, PVC, polycarbonate, and APET.

It is important to the fabrication method of the invention that two things occur: (1) the inks 28 must be protected from the extreme heat of the molten plastic in the molding process 52 so that they are not damaged and (2) the surface of the Lenticular insert 20 that abuts the outer wall 12 must be compatible with the injection or other molding process (in other words, the process 40 needs to provide an adequate or very favorable bond to the molten plastic used in the injection or other molding process 52). Therefore, the standard ink used to create ink layer 28 on the back of the lens layer 24 is not suitable for this purpose.

As an alternate to the lamination process for applying the substrate 30 discussed above, the substrate 30 may be applied by other techniques that effectively attach the substrate 30 to the ink 29 while eliminating the liner application and removal steps discussed above. In this alternative step 46, the poly material forming the substrate 30 is applied directly to the back of the lens layer 24 over the ink 28 without the liner or carrier. In this alternative step 46, the poly material of the substrate 30 may be applied in a number of ways including, but not limited to, with the use of a thermal adhesive, a hot melt adhesive, or a pressure sensitive adhesive. In addition, there may be other liquid chemistry adhesives in the urethane and epoxy areas that may in some embodiments be useful with the invention. Further, the substrate 30 may instead be another material that achieves the bonding and thermal protection goals while allowing for an alternate application step 46. For example, coatings may be used for the substrate 30 to accomplish the same goal in the molding process as the poly laminates. While generally more difficult to use, coatings can provide the functions of protecting the ink 28 while providing a surface that provides for bonding the piece during the injection or other molding process 52. The following coatings may be useful as the substrate 30: UV curable, solvent-based, E-beam curable, and water-based coatings. The thickness of these coatings needed to thermally protect the ink 28 and, in some applications, to bond to the outer wall 12 material in the molding processed will vary with each material, but generally, a coating substrate 30 has a thickness between 0.5 and 2.0 mils. Any of these coatings may be applied to the part or sheet with a variety of methods and equipment such as: roller-coating equipment, blanket coating equipment (such as on a press), screen equipment, and spray equipment.

Referring again to FIG. 4, the fabrication process 40 continues at 48 wherein the Lenticular inserts 20 are cut or otherwise removed from Lenticular material sheets now having the bonding and thermal protection substrate 30 attached, with or without the liner. At 48, the Lenticular material sheet is further processed and/or cut to form Lenticular inserts 20 with the desired shape for the in-mold process step 52. Typically, step 48 is completed with a guillotine cutter for square and rectangular pieces and a die cutter for other shapes such as the Lenticular insert 20 illustrated. After the Lenticular insert 20 is die cut or otherwise formed, the throw away liner (if attached to the substrate 30) is removed so that the hot melt poly material of substrate 30 is exposed. Alternatively, the liner may be removed in an in-line application in the process 40 prior to step 48.

Figure 5:
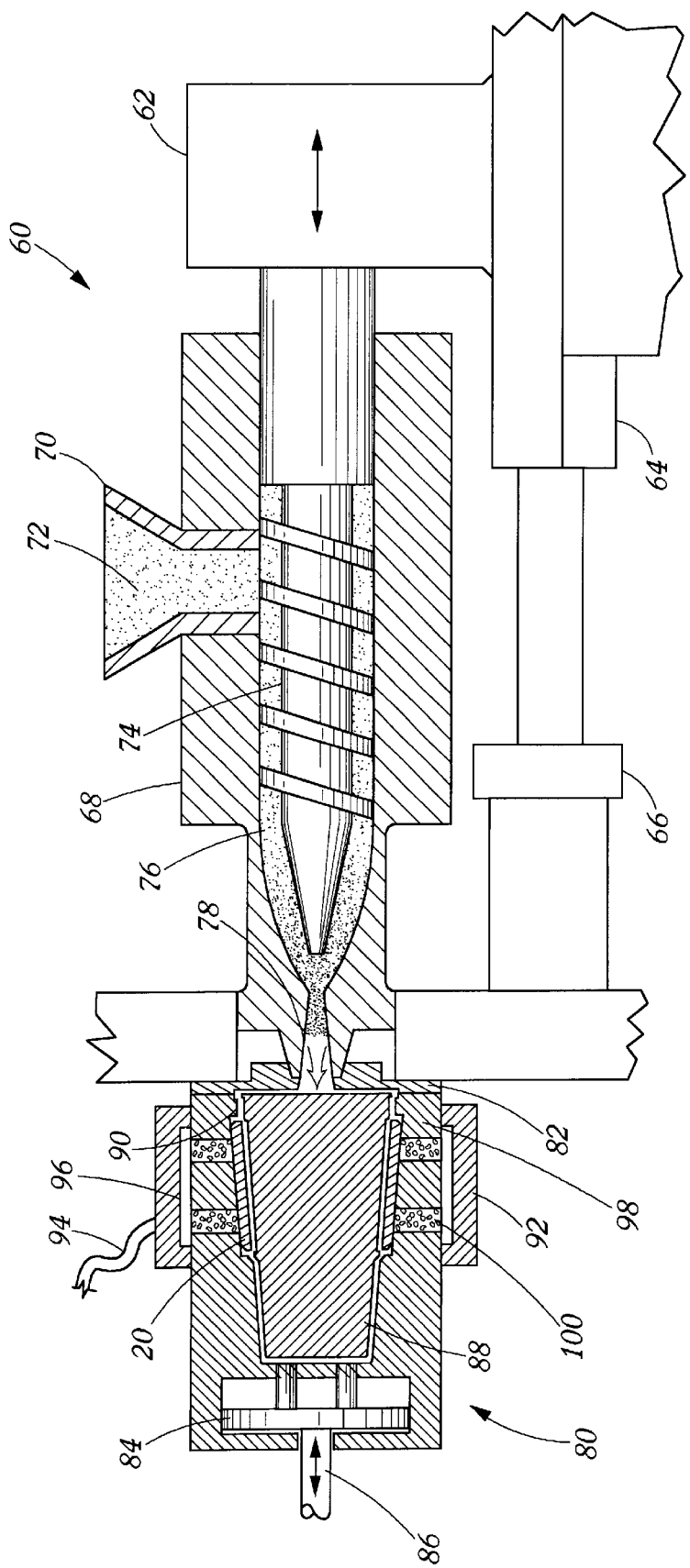
FIG. 5 is sectional view of an injection molding assemble according to the resent invention with the Lenticular insert positioned with a developed vacuum against the outer walls of the mold cavity prior to injection of liquid plastic into the mold.

With reference to FIGS. 4 and 5, the Lenticular insert 20 is then placed via hand or robotics into a mold cavity 90 of a mold 80 portion of a molding tool 60 (an injection molding assembly is illustrated but other molding devices, such as a blow molding assembly, may be used). The mold cavity 90 of the molding tool 60 is specifically configured to accommodate the Lenticular insert 20. The Lenticular insert 20 is placed in the mold cavity 90 so that the hot melt poly side or substrate 30 of the Lenticular insert 20 is exposed to the molten plastic in the mold cavity 90 during step 52.

At 52, the container 10 is molded. In one embodiment, the molding step 52 is completed by plastic injection molding processes. Referring to FIG. 5, an injection molding tool 60 is illustrated that is configured for molding containers 10 with a Lenticular insert 20. As illustrated, the injection device that is configured for molding tool 60 is a single-stage reciprocating screw type which tends to thoroughly prepare material for injection and is often faster, but, clearly, other injection molding tools may be utilized such as a conventional single-stage plunger type or a two-stage plunger or screw plasticisor type. During operation the raw plastic (i.e., the material charge of thermoplastic material) 72 is fed into the material hopper 70 where it contacts the injector screw 74. As the screw 74 is turned by the screw drive motor 62, the screw 74 is pushed backward (to the right in FIG. 5) and the material charge 72 is forced into the chamber 76 of the heating cylinder 68. When enough material 72 to fill the mold cavity 90 has been prepared (i.e., heated to between 300 and 700° F. depending on the type of plastic), the screw drive motor 62 is shut off to stop turning the screw 74. The pull-in cylinder 66 is operated to move the screw 74 on the slide 64 to ram the material charge 72 through the inlet nozzle 78 into the mold cavity 90 of the mold 80.

The plastic liquid resin 72 is injected into the mold cavity 90 defined by the passages between and within the mold to 82, the mold body 84, and the center die 88. The plastic 72 is injected under high heat and pressure (5000 to 50,000 psi) and contacts the exposed portions of the Lenticular insert 20. The hot melt poly material of the substrate 30, when exposed to the liquid plastic 72 (at around 500° F. but may be varied depending on the polymer used for the liquid plastic material charge 72) is activated substantially immediately and at least the outer portion of the substrate 30 (or layer 150 in some embodiments or layer 160 in other embodiments) exposed to the liquid plastic 72 becomes a liquid. The exposed and heated portion of the substrate 30 exposed to the liquid plastic 72 becomes a liquid. The exposed and heated portion of the substrate 30 remains a liquid for a very brief time and then re-solidifies in the mold as the entire container 10 cools in step 54. This process creates an almost instant and substantially permanent bond at the interface 32 between the Lenticular insert 20 and outer wall 12 of the container 10. The thin layer of hot melt poly of substrate 30 bonded to the Lenticular insert 20 acts to thermally insulate the ink 28 protect the ink form the heat and physically protect the ink 28 from the pressure of the process, thereby leaving the ink 28 intact. The thickness of the substrate 30 can vary significantly with the type of material used but is preferably minimized to control costs and allow the insert 20 to be an integral part of the outer wall 12, and in one embodiment, the substrate thickness is maintained in the range of 1 to 3 mils.

In practice, the injection of the liquid plastic 72 during step 52 causes the temperature of the center die 88 (i.e., the male or inner portion of the mold 82) and the mold body 84 (i.e., the female or outer portion of the mold 82) to increase until it approaches the temperatures of the injected liquid plastic 72. As noted above, the liquid plastic 72 may be injected at 300 to 700° F. (e.g., about 500° F. for polyethylene) depending on the raw materials chosen and this causes the center die 88 and mold body 84 to rise in temperature to the range of 300 to 700° F. and more typically, to the range of 250 to 400° F. The protective substrates 30 or 150 effectively provide a thermal insulation barrier for the image ink layer 28 against the liquid plastic 72 and the center die 88. However, the optical ridges 22 are pressed or held tightly in direct heat transfer contact with the mold body 84. Without some form of heat protection, the optical ridges 22, which are fabricated of APET, PTEG, or other material that may be susceptible to high temperature deformation, can become deformed or flattened when heated above a deformation temperature (which preferably is determined for each optical ridge 22 material), thereby changing or harming the focus achieved by the lens layers 22 and 24. This can ruin or at least degrade the optical effects obtained by the Lenticular insert 20. The deformation or flattening typically occurs during the dwell time necessary to form and cool the cup or object 10. The high temperatures of the liquid plastic 72 are preferred for proper flow and injection during step 52 and the hold or dwell time is preferred for proper curing and formation of the walls 12 of the cup 10. Because the center die 88 and liquid plastic 72 typically need to be held at higher temperatures to form the object 10, there is a need for a method of protecting the optical ridges 22 from these high processing temperatures.

To address this deformation problem, a cooling system (not shown) can be included in the injection molding tool 60 to maintain the mold body 84 or, more preferably, a region of the mold body 84 adjacent the Lenticular insert 20, below the predetermined deformation temperature for the optical ridges 22. In this manner, the center die 88 can be allowed to rise to an acceptable forming or processing temperature (such as about 350° F. for polyethylene or polypropylene liquid plastic 72) while the mold body 84 or a smaller insert contacting region of the mold body 84 is concurrently maintained at a second, lower operating temperature at or below the predetermined deformation temperature. Typically, it is preferable that the second, lower operating temperature be a selected tolerance level or amount below the predetermined or anticipated deformation temperature to more effectively insure that the optical ridges 22 are not detrimentally deformed. For example, a deformation temperature for optical ridges 22 formed of PETG is about 160° F. (i.e., actual deformation temperature minus a selected tolerance of 0 to 20° F.) and a deformation temperature for optical ridges 22 formed of APET is about 170° F. (i.e., actual deformation temperature minus a selected tolerance of 0 to 20° F.). Other deformation temperatures would of course apply to other optical ridges 22 materials.

In a preferred embodiment, only the insert contacting region is maintained at the second, lower operating temperature rather than the entire mold body 84 to allow the liquid plastic 72 to properly form in the areas of the cup 10 that do not include the Lenticular insert 20. The insert contacting region may include the entire area of the mold body 84 adjacent the insert 20, extend a small distance into the forming plastic 72 to insure that even the edges of the insert 20 are not heated above the deformation temperature, or alternatively, may include an area adjacent the insert 20 that is smaller than the insert 20 to insure that plastic 72 adjacent the edges of the insert 20 are properly formed (with a small amount of the optic ridges 22 being allowed to be deformed at the edges of the insert 20). The technique of controlling the center die 88 and mold body 84 (or an insert contacting portion) at two differing temperatures is a significant and unique feature of the invention which typically would not be practiced in standard injection processes which attempt to operate to achieve consistent curing and formation of injected plastic with relatively consistent processing temperatures throughout a mold.

A number of embodiments can be envisioned for selectively cooling (i.e., removing heat from) the insert contacting region of the mold body 84. Although not shown, such heat transfer devices will readily be understood from the following description by those skilled in the heat transfer and/or manufacturing arts. For example, the cooling system may include a cooling jacket connected to one or more chillers positioned about the mold body 84 with a fluid channel for providing a flow path for a cooling fluid to pass in heat conducting contact with the insert contacting region of the mold body 84. Of course, the shape and size of the fluid channel may be changed to better suit the shape of the particular Lenticular insert 20. The cooling fluid utilized may be a gas such as air, or more preferably, a liquid such as water with a higher heat transfer coefficient to achieve more effective heat transfer, i.e., cooling, with less fluid flow. The temperatures selected for the input cooling fluid and the flow rates preferably are established to efficiently and effectively provide cooling of the insert contacting region to maintain this portion of the mold body 84 at or below the deformation temperature. In an alternative embodiment, the fluid channel (or channels) may be incorporated into the mold body 84 to achieve desired temperature control (i.e., cooling). Temperature sensors may be inserted in sensor wells placed in the mold body 84 near the insert contacting region to sense the operating temperature during injection processes and the sensed temperature may be utilized to establish a temperature of the input cooling fluid and a useful fluid flow rate for a particular inlet temperature. The cooling jacket and internal cooling channel (s) embodiments are provided for example only and a number of other useful cooling or heat rejection embodiments may be utilized to practice the invention.

Significantly, an important feature provided by the invention is the incorporation of two temperature controls within a single injection molding process. The injection molding device and cooling system may be varied from those shown and described as long as the internal die is allowed to be heated to a processing temperature for effective plastic injection and formation concurrently with (or at least partially concurrently with) the external or female portion of the mold (and specifically, the region adjacent or near the Lenticular insert 20) being cooled to maintain its temperature at or below a predetermined deformation temperature to protect the optical ridges 22.

Additionally, the framing system discussed previously is created in this molding step 52, and the Lenticular insert 20 is formed to leave flow paths for the molten plastic to form frame members 14, 16 and 18 (seam frame member 18 being formed due to a gap or flow path between the side edges of the Lenticular insert 20 that is formed when the Lenticular insert 20 is placed within the mold cavity 90 and the vacuum is applied, as discussed below). At 54, the injected material in the mold 80 is allowed to cool within mold 80 until it has hardened adequately. At this point, the hardened and formed container 20 with an integrally bonded Lenticular insert 20 is ejected by the ejector 86, positioned in the mold body 84, and the container fabrication process 40 is ended at 56 (with removal of flash and the undesired top portion of the container 10 resulting from the inlet flow passages of the mold 80).

According to a significant feature of the fabrication process 40, the outer surface (i.e., the optical ridges 22) is forcefully positioned in abutting contact with the outer walls of the mold cavity 90. This is important because the failure to do so results in molten plastic material 72 making its way to the front of the Lenticular insert 20 and "bleeding" onto the optical ridges 22, thereby preventing a portion of the image from being seen and creating undesirably ragged plastic seams and framing. In order to prevent seeping of molten plastic 72, the following position retention processes, among other retention techniques, may be employed as part of the plastic molding step 52.

In the embodiment illustrated in FIG. 5, the molding tool 60 is configured so that it holds the Lenticular insert 20 tightly to the wall of the mold cavity 90 by the development and application of a vacuum. In this manner, the molten plastic 72 is blocked from flowing onto the optical ridges 22 and is limited to flow paths that form the shape and outer wall 12 of the container 10. This may be done by configuring the molding tool 60 to develop a vacuum at the outside walls of the tool to pull the Lenticular insert 20 firmly against the outer walls of the mold cavity 90 prior to beginning the injection of molten plastic. Of course, the vacuum developed must be strong enough to overcome any forces and pressures that are placed on the Lenticular part during the injection process. As illustrated in FIG. 5, the vacuum is created in a vacuum chamber 96 that encircles the mold 80 and is formed within the vacuum housing 92 which is attached to the mold body 84. A vacuum hose 94 is in communication with the vacuum chamber 96 to provide the necessary suction to establish (and also to release) the vacuum. The vacuum or suction forces are applied to the Lenticular insert 20 through vacuum chamber 96 and the Lenticular insert 20. While any number and location of vacuum passages may be used, in one embodiment, two vacuum passages 98, 100 that are circular to contact the Lenticular insert 20 at substantially its entire circumference and at the two ends or edges of the Lenticular insert 20 are utilized. A number of designs may be used for the vacuum passages 98, 100 such as fully or partially open air flow channel in the mold body 84. In the preferred embodiment illustrated, a porous plastic material is utilized to provide a controlled flow of air while also minimizing any flow of resin plastic 72 that may potentially begin to enter the vacuum passages 98, 100.

In a second preferred embodiment (not illustrated), a position retention method provides a solution to the plastic seeping problem through the added step of applying buttons, projected slots, or other raised surfaces to the substrate 30 side of the Lenticular insert 20 prior to insertion into the mold cavity 90. When the Lenticular insert 20 having the buttons or raised surfaces is positioned within the mold cavity 90 and the center die 88 is positioned, the buttons are raised surfaces that abuttingly contact the center die 88 and are pushed outward and toward the outer walls of the mold cavity 90, thereby forcing the optical ridges 22 against the mold cavity 90 walls and cutting off any seepage flow paths.

The buttons or slots preferably are arranged symmetrically around the Lenticular insert 20 and in conical shaped objects, such as cups and the container 10, are primarily needed at the portion of the Lenticular insert 20 nearer the inlet nozzle 78 where the liquid plastic 72 is inserted and pressure is greater. The thickness of these buttons or slots preferably is selected to be approximately, if not exactly, the same as the object thickness in some applications or as illustrated the outer wall 12 thickness (less the thickness of the Lenticular sheet or other insert). The projecting buttons or slots are typically made of a plastic material that is compatible with the material used in the injection molded process. In many cases, it is preferable to use material identical to the material used in the molded object.

The small buttons or slots are attached to the Lenticular insert 20 prior to insertion into the mold 80. They may be applied in a variety of ways, from hand application to an automated, self-feeding machine. The buttons or slots may be applied using pressure sensitive glue, or any appropriate adhesive. In addition to using pre-made buttons or slots, the desired raised or spacer surfaces may be formed with any type of hot or liquid (may be an epoxy) material placed on the Lenticular insert 20 (as part of the initial fabrication in step 44 or after the cut out step 48). This would allow a droplet of molten plastic or some type of polymer with enough body to remain three-dimensional and not flow out onto the part. The droplet of liquid or molten plastic could cure or dry partially while remaining pliable and soft enough to be deformed or flattened in the process with a calendaring roller which flattens the raised surface to the exact height needed for the molding process 52 (about or exactly the thickness of the wall 12 of the container or other molded object).

In this embodiment of the position retention process, the secondary parts (or buttons) can be applied quickly and economically and in a very automated process. In raised surface attachment process, the Lenticular material sheet or the Lenticular inserts 20 would be moving on a conveyor system and dots, slots, or buttons of liquid material would be applied. A few feet down the conveyor, the sheets or inserts 20 would run under a roller in which the liquid dots, slots, or buttons would be calendared or flattened to the desired level or thickness accurately prior to the dots, slots, or buttons curing or drying (forming) completely. Calendaring processes are quite accurate and maintain the thickness necessary to provide the Lenticular material sheet or Lenticular insert 20 along with the dots, slots, or buttons that allows the sheet or part to be held in place against the outside of the mold cavity 90, thereby preventing undesired filling of the molten or liquid plastic 72 on the front side or visual side (i.e., on the optical ridges 22) of the Lenticular insert 20 by holding the Lenticular insert 20 tightly under pressure to the mold cavity 90 walls.

Those skilled in the plastic fabrication arts will understand that the inventive method 40 may be practiced with other plastic molding techniques and the invention is not limited to injection molding for step 52. For example, molding step 52 may be achieved with blow molding techniques. In this mode of operation (not illustrated), a heated length of thermoplastic material shaped as a tube (called a parison) is placed on air nozzle between the halves of an open mold (although the parison may be extruded within the cavity on some molding machines). The Lenticular insert 20 is inserted within the cavities of the mold and the mold is closed to pinch shut the open end of the parison opposite the air nozzle. Air is then blown into the parison to expand such that the still hot thermoplastic material contacts the substrate 30 of the Lenticular insert 20 forming a bond at interface 32 between the outer wall 12 of the container 10.

Of course, blow molding is more appropriate for hollow plastic objects such as squeeze bottles and the like rather than for objects shaped like container 10. In this regard, it should be noted that in the above discussion of a process according to the invention a container was fabricated for simplicity of illustration and discussion and because of the particular effectiveness of the inventive method in forming such cups with Lenticular inserts. However, the inventive fabrication method is similarly useful in fabricating any plastic object having a Lenticular insert bonded to a surface. The important features of the inventive method are that the ink of the Lenticular material is protected and that a unique bonding surface is provided between the Lenticular material and the molten plastic.

Obviously, a complete list of the large number of plastic items that cannot be provided herein, but the following is a representative sampling of the types of plastic objects that can be fabricated with the fabrication method of the invention: containers of all shapes and sizes, credit, debit, and money cards, telephone cards, prepaid purchasing cards, identification cards, video and audio medium containers, toys, watches, book and literature covers, trading cards, decorations, and the like.

The foregoing description is considered as illustrative only of the principles of the invention. Furthermore, since numerous modifications and changes will readily occur to those skilled in the art, it is not desired to limit the invention to the exact construction and process shown and described above. For example, although the container 10 was fabricated such that the Lenticular insert 20 was held to the outer wall 12 with a framing system and by bonding between substrate 30 and the outer wall 12 at 32, many applications can be imagined wherein only one of these features of the invention would be used to hold or bond the Lenticular insert 20 to the container or other plastic object. Consequently, the use of only one of these techniques to produce a plastic object with a Lenticular insert is within the disclosure and breadth of the invention.

Additionally, according to the method of the invention, the ink of the Lenticular insert is protected from extreme heat, and this thermal protection would also be provided to other heat sensitive devices that could be laminated within the Lenticular insert 20 (such as between the lens layer 24 and the substrate 30). These devices may be useful for further enhancing the images provided with the Lenticular insert 20 and may be used to provide movement, changes in color, provide light, and even interactivity. Such included devices may include flat batteries to power included intelligence, sound chips, lighting pipes or other lighting devices, and other miniature electronic devices. Additionally, it is often desirable to add coding or numbering to a collector's cup or object to control counterfeiting, and the above fabrication process may readily include steps that number or otherwise identify the fabricated object (e.g., by adding a number to the ink layer of the Lenticular insert 20) to make the object unique and more desirable as a collectible. Similarly, this coding or numbering can be used to encode a sweepstakes contests number or security number (i.e., variable data) on the ink layer 28 which is not exposed. The ink layer 28 is protected from damage or tampering once the container or object is formed by the plastic of the container or object and by the lens layers 22, 24, thereby, controlling counterfeiting and copying to increase security and retaining the high quality image of the Lenticular insert 20 for a longer period (i.e., increasing the service life of the Lenticular insert 20 as wear from normal use, such as placing a container in a dishwasher, does not occur on the protected ink layer 28). Further, intermediary steps of the fabrication process 40 may in some cases be eliminated while still practicing the disclosed invention. Accordingly, resort may be made to all suitable modifications and equivalents that fall within the scope of the invention as defined by the claims which follow.

I claim:

1. A method of fabricating plastic products with integral Lenticular lens material, comprising:

providing a Lenticular lens material comprising a Lenticular lens layer having a first surface comprising optical ridges and a second surface comprising an outer ink layer bonded to a transparent lens layer;

applying a thermal protective substrate to the outer ink layer comprising an ink with a predetermined opacity level;

forming a Lenticular insert from the thermally protected Lenticular lens material;

positioning the Lenticular insert in a mold cavity of a plastic molding assembly; and operating the plastic molding assembly to process a liquid plastic charge into the mold cavity at a molding temperature and to form a plastic object;

wherein the substrate is adapted for thermally isolating the outer ink layer during the operating of the plastic molding assembly.

2. The method of claim 1, wherein the molding temperature is in the range of 300° to 700° F. and wherein the plastic charge is selected from the group consisting of polypropylene, styrene, polyethylene, and polyvinyl chloride.

3. The method of claim 1, wherein the thermal protective substrate comprises a flexographic ink and the opacity level is substantially opaque.

4. The method of claim 3, wherein the substrate has a thickness selected from the range of about 0.5 to about 2.0 mils.

5. The method of claim 3, wherein the applying comprises operating a coating unit of a lithographic press to apply a layer of the ink to the outer ink layer.

6. The method of claim 1, further comprising prior to the applying of the thermal protective substrate, coating the outer layer of ink with a primer coat of material that is transparent and comprising a material that enhances the bond between the outer ink layer and the thermal protective substrate.

7. The method of claim 1, further including applying a bonding layer to the thermal protective layer comprising a material that bonds with the thermal protective layer and bonds to the plastic charge during the operating of the plastic molding assembly.

8. The method of claim 7, wherein the bonding layer comprises a UV-curable primer.

9. The method of claim 7, wherein the bonding layer comprises oriented polypropylene, polyethylene, or mixtures thereof.

10. The method of claim 7, wherein the bonding layer is fabricated to include an outer textured surface for mating with the plastic charge to enhance bonding.

11. A plastic product fabricated according to the method of claim 1.

12. A method of manufacturing a plastic product with a Lenticular insert that thermally protects the Lenticular insert, comprising:
    providing a Lenticular insert comprising a Lenticular lens layer having a first surface of optical ridges and a second surface and an ink layer bonded to the second surface of the Lenticular lens layer and encapsulated with a thermal protective substrate;
    positioning the Lenticular insert in a mold cavity of a plastic molding assembly defined by an outer mold body and a center die and configured to define dimensions of the plastic product with the first surface adjacent an insert contacting region of the mold body;
    operating the plastic molding assembly to at least partially fill the mold cavity with liquid plastic at a plastic processing temperature, whereby the center die is heated to a first operating temperature; and
    at least partially concurrent with the operating, cooling the insert contacting region of the mold body to a second operating temperature, wherein the second operating temperature is less than about a predetermined deformation temperature of the optical ridges and is less than the first operating temperature.

13. The method of claim 12, wherein optical ridges comprise PETG and the deformation temperature is about 160° F.

14. The method of claim 12, wherein the optical ridges comprise APET and the deformation temperature is about 170° F.

15. The method of claim 12, wherein the plastic processing temperature is in the range of about 300 to 700° F. and the first operating temperature is in the range of about 250 to 400° F.

16. The method of claim 12, wherein the insert contacting region includes one of all of an area of the mold body adjacent the Lenticular insert, less than all of the area of the mold body adjacent the Lenticular insert, and all of the area of the mold body adjacent the Lenticular insert in combination with an area defined by a tolerance distance extending from the peripheral edge of the first surface of the Lenticular insert.

17. The method of claim 12, wherein the thermal protective substrate comprises opaque ink with a thickness of about 0.5 to 2.0 mils.

18. The method of claim 12, wherein the thermal protective substrate comprises polyester, polypropylene, polyvinyl chloride, or vinyl.

19. The method of claim 12, wherein the thermal protective substrate comprises pressure sensitive polyvinyl chloride or polypropylene.

20. A Lenticular insert for use in fabricating plastic objects with molten plastic, comprising:
    a lens layer comprising an optic ridge surface and a transparent lens layer with a planar surface opposite the optic ridge surface;
    an image layer comprising ink arranged to define an image when viewed through the lens layer; and
    a thermal protective substrate adjacent the image layer, wherein the thermal protective substrate comprises ink.

21. The Lenticular insert of claim 20, wherein the ink of the thermal protective substrate comprises opaque white ink having a thickness in the range of about 0.5 to about 2.0 mils.

22. The Lenticular insert of claim 20, wherein the ink of the thermal protective substrate is flexographic ink.

23. The Lenticular insert of claim 22, further including a bonding layer between the transparent lens layer and the image layer, comprising lithographic UV-cured primer material.

24. The Lenticular insert of claim 20, further including a bonding layer coating the thermal protective substrate.

25. The Lenticular insert of claim 24, wherein the bonding layer comprises lithographic UV-cured primer material.

26. The Lenticular insert of claim 24, wherein the bonding layer comprises oriented polypropylene, polyethylene, or mixtures thereof.

27. The Lenticular insert of claim 24, wherein the bonding layer further includes a textured bonding surface for mating with and bonding to the molten plastic.

* * * * *